United States Patent
Horschel

(10) Patent No.: US 12,188,539 B2
(45) Date of Patent: Jan. 7, 2025

(54) NESTED INERTIA RING FOR TORSIONAL VIBRATION DAMPER

(71) Applicant: Horschel Brothers Precision LLC, Springville, NY (US)

(72) Inventor: Karl G. Horschel, Springville, NY (US)

(*) Notice: Subject to any disclaimer, the term of this patent is extended or adjusted under 35 U.S.C. 154(b) by 0 days.

(21) Appl. No.: 17/955,649

(22) Filed: Sep. 29, 2022

(65) Prior Publication Data
US 2023/0106255 A1    Apr. 6, 2023

Related U.S. Application Data

(60) Provisional application No. 63/252,693, filed on Oct. 6, 2021.

(51) Int. Cl.
*F16F 15/14* (2006.01)
*F16F 15/173* (2006.01)

(52) U.S. Cl.
CPC ...... *F16F 15/1485* (2013.01); *F16F 2222/08* (2013.01); *F16F 2232/02* (2013.01); *F16F 2236/08* (2013.01)

(58) Field of Classification Search
CPC .... F16F 15/1485; F16F 15/167; F16F 15/173; F16F 2222/08; F16F 2232/02; F16F 2236/08
See application file for complete search history.

(56) References Cited

U.S. PATENT DOCUMENTS

| | | | | |
|---|---|---|---|---|
| 3,121,347 A | * | 2/1964 | Rumsey | F16F 15/173 74/573.1 |
| 3,603,172 A | * | 9/1971 | Hall | F16F 15/173 188/379 |
| 4,295,546 A | * | 10/1981 | Vollett | F16F 15/173 188/322.5 |
| 5,749,269 A | * | 5/1998 | Szymanski | F16F 15/173 74/573.12 |
| 5,941,133 A | * | 8/1999 | Wierzba | F16F 15/363 74/570.2 |
| 5,979,390 A | * | 11/1999 | Depp | F01L 1/02 123/192.1 |
| 10,563,724 B2 | * | 2/2020 | Bohmeyer | F16F 15/173 |
| 10,584,764 B1 | * | 3/2020 | Horschel | F16F 15/173 |
| 10,935,101 B2 | * | 3/2021 | Bohmeyer | F16C 17/10 |
| 11,692,404 B2 | * | 7/2023 | Peters | E21B 17/076 175/57 |
| 2007/0284197 A1 | * | 12/2007 | Kiener | F16F 15/13114 188/73.35 |
| 2009/0078077 A1 | * | 3/2009 | Horschel | F16F 15/173 74/573.1 |

(Continued)

*Primary Examiner* — Thomas W Irvin

(57) ABSTRACT

A torsional vibration damper with a housing defining an annular space. A cover is mounted on the housing. The cover and the housing define an annular working chamber. A first mass inertia ring is disposed inside and configured to rotated relative to the annular working chamber. A second mass inertia ring is disposed inside the annular working chamber. The second inertia mass ring is configured to rotate inside the annular working chamber independently with respect to the first inertia mass ring. A viscous damping media is disposed inside the annular working chamber. A hub is configured to extend from the housing in an axial direction. The hub is configured for attaching the damper to a crankshaft

12 Claims, 3 Drawing Sheets

(56) References Cited

U.S. PATENT DOCUMENTS

| | | | |
|---|---|---|---|
| 2011/0048877 A1* | 3/2011 | Geislinger | F16F 15/173 |
| | | | 188/290 |
| 2020/0124133 A1* | 4/2020 | Bohmeyer | F16C 17/10 |
| 2021/0079976 A1* | 3/2021 | Peters | E21B 4/003 |
| 2021/0381580 A1* | 12/2021 | Reinsperger | F16F 15/173 |

* cited by examiner

NESTED INERTIA RING FOR TORSIONAL VIBRATION DAMPER

CROSS-REFERENCE TO RELATED APPLICATION

The present application claims priority benefit of U.S. Provisional Patent Application No. 63/252,693 filed on Oct. 6, 2021, and entitled "Nested Inertia Ring for Torsional Vibration Damper," which is hereby incorporated by reference.

TECHNICAL FIELD

The present invention relates generally to improvements in viscous torsional vibration dampers and to a method of making a torsional vibration damper.

BACKGROUND OF THE INVENTION

Viscous torsional vibration dampers provide a housing defining an axially opening annular working chamber. A complementary annular inertia mass ring is disposed inside the working chamber defined in the housing. A cover is sealed across the axial opening of the housing for confining the inertia ring within the annular working chamber. Opposed surfaces of the inertia ring and the housing are in shear film, spaced relation and a viscous damping fluid substantially fills the spaces between the inner walls of the housing and the inertia ring. A hub may extend from the viscous torsional vibration damper for connecting the damper to a crankshaft.

SUMMARY OF THE INVENTION

Figure 1:
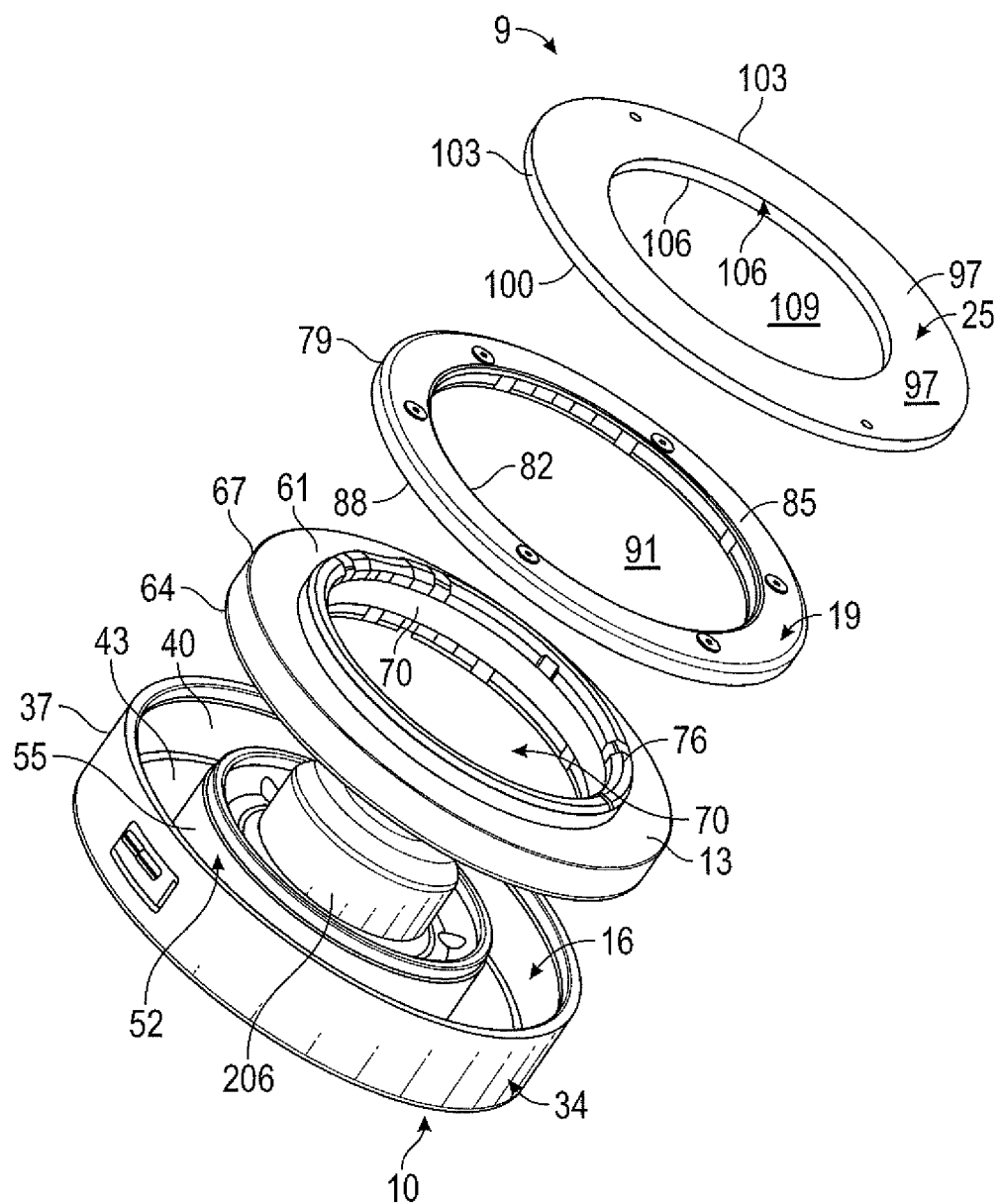
FIG. 1 is an exploded view of a torsional vibration damper of one embodiment of the invention.

The present invention provides a damper assembly (9) with a housing (10) configured to receive a nested configuration for the inertia mass rings (13) and (19). The nested configuration allows for multiple frequency targeted, viscous controlled inertia mass rings (13), (19) within a single sealed housing (10). This configuration provides the damper assembly (9) with the ability to cover a broader frequency range than single inertia ring dampers, without added mass and inertia of dampers configured with separate sealed cavities. This configuration also reduces the number of components needed for assembly.

The housing (10) has a central opening (58) defined therein. The housing (10) has an axis of rotation (59) disposed through the center of the opening (58).

A viscous damping media substantially fills shear film spaces between the working surfaces of the inertia rings (13) and (19) and between confronting working surfaces of the housing (10) within the chamber (16).

In one embodiment a torsional vibration damper comprises a housing (10) defining an annular space. A cover (25) is mounted on the housing (10). The cover (25) and the housing (10) define an annular working chamber (16). A first mass inertia ring (13) is disposed inside and configured to rotated relative to the annular working chamber (16). A second mass inertia ring (19) is disposed inside the annular working chamber (16). The second inertia mass ring (19) is configured to rotate inside the annular working chamber (16) independently with respect to the first inertia mass ring (13). A viscous damping media is disposed inside the annular working chamber (16). A hub (25) is configured to extend from the housing (10) in an axial direction. The hub (25) is configured for attaching the damper to a crankshaft.

In another aspect of the invention, the viscous damping media substantially fills shear film spaces between working surfaces of the first and second mass inertia rings (13, 19) and confronting working surfaces of the housing (10) and cover (25) within the chamber (16).

In another aspect of the invention, the second mass inertia ring (19) is disposed adjacent to the first mass inertia ring (13).

In an additional aspect of the invention, the first mass inertia ring (13) is constructed of a different material than the second mass inertia ring (19).

In yet another aspect of the invention, the density of the first mass inertia ring (13) is different than the density of the second mass inertia ring (19).

In a further aspect of the invention the first mass inertia ring (13) has at least one bearing surface (22, 23) formed thereon for engaging with corresponding surfaces of the second mass inertia ring (19) when the first and second mass inertia rings (13, 19) are disposed in the annular working chamber (16).

In another aspect of the invention the first mass inertia ring (13) has an upstanding radial wall (76) extending therefrom.

In yet another aspect of the invention, a portion of the upstanding radial wall (76) on the first mass inertia ring (13) forms a bearing surface (23) for engaging with a portion of the second mass inertia ring (19).

In another aspect of the invention, the first mass inertia ring (13) has another bearing surface (22) configured such that it is substantially parallel to a top surface (61) of the first mass inertia ring (13).

In a further aspect of the invention, the second mass inertia ring (19) has a recessed portion (94) on a bottom surface (88) and the recessed portion (94) is configured to engage with the bearing surfaces (22, 23) on the first mass inertia ring (13).

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly"

generally refer to the orientation of a surface relative to its axis of elongation, or of rotation, as appropriate.

Figure 2:
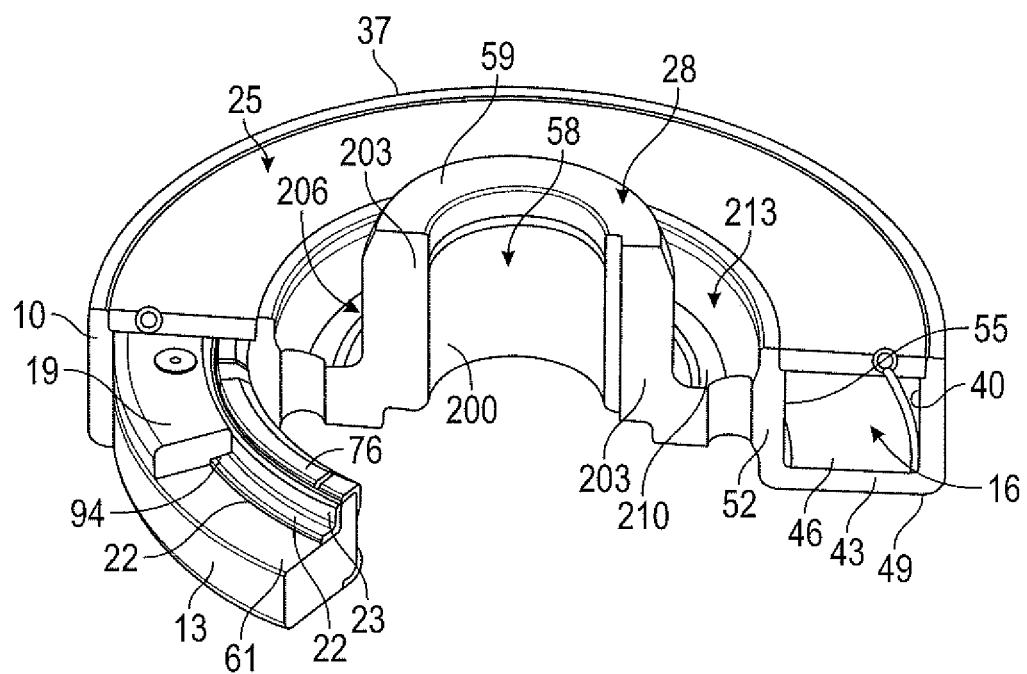
FIG. 2 is a cross-sectional view of the torsional vibration damper.
Figure 3:
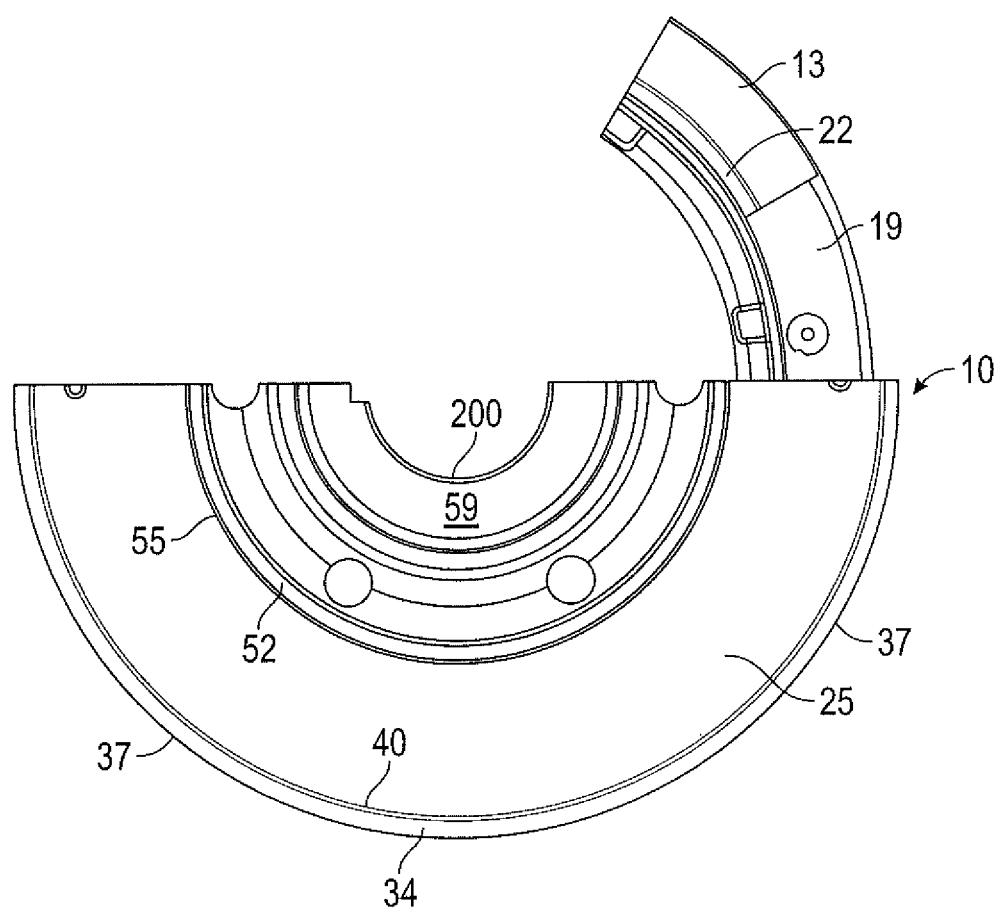
FIG. 3 is a top plan view of a portion of the torsional vibrational damper.

Referring to FIGS. 1-3, and initially to FIG. 1, the main components of the embodiment of a damper assembly 9 shown include an annular shaped housing 10 that receives a first inertia mass ring 13 in a working chamber 16 (best shown in FIG. 2). A second inertia mass ring 19 fits onto the first inertia mass ring 13 and is configured to rotate independently of the first inertia mass ring 13 inside the working chamber 16 along bearing surfaces 22 and 23 (FIG. 2). A cover 25 attaches to the housing 10 to form the working chamber 16. A hub 28 (FIG. 2) may be provided for connecting the torsional vibration damper 31 to a crankshaft (not shown).

The housing 10 has an outer wall 34 that has an outer radial surface 37 facing outward and an inner radial surface 40 facing inward. The surfaces 37 and 40 are separated by the thickness of wall 34. The bottom of outer wall 34 extends to a bottom wall 43 of the housing 10. The bottom wall 43 has an inner surface 46 (FIG. 2) that forms part of the working chamber 16 and has an outer surface 49 (FIG. 2) that forms a portion of the exterior of the housing 10. Disposed inward from the outer wall 34 in the radial direction, an inner wall 52 extends upward from the bottom wall 43 of the housing 10. The inner wall 52 has an outer radial surface 55 that faces toward the inner radial surface 40 of the outer wall 34. The surfaces 55 and 40 are disposed in spaced apart relation and these surfaces combine with the inner surface 46 of the bottom wall 43 to form the working chamber 16 (best shown in FIG. 2).

As best shown in FIG. 2, the hub 28 is formed inward from the inner wall 52 in the radial direction and surrounds a central opening 58. The hub 28 has a top surface 59 and an inner radial surface 200 surrounding central opening 58. A radial wall 203 extending in the axial direction has a radial outer surface 206. The inner radial surface 200 is separated from the outer radial surface 206 by the thickness of the wall 203. The radial wall 203 may be connected to the inner wall 52 by an inward extending portion 210 that forms a recessed area 213 between the inner wall 52 and the hub 28.

Returning to FIG. 1, the first inertia mass ring 13 has a top surface 61 facing in the axial direction and a bottom surface 64 facing opposite the top surface 61. The ring 13 has an outer radial surface 67 and an inner radial surface 70 surround a central opening 73. As best shown in FIG. 2, toward the inner radial surface 70, a radial wall 76 extends upward from the top surface 61. The radial wall 76 has an outer radial surface 23 extending upward in the axial direction and has a radial surface 22 extending above and substantially parallel to the top surface 61. Surfaces 22 and 23 provide bearing surfaces for rotational engagement between the first inertia mass ring 13 and the second inertia mass ring 19.

The second inertia mass ring 19 has an outer radial surface 79 and an inner radial surface 82. In the axial direction, the second inertia mass ring 19 has a top surface 85 and a bottom surface 88. The second inertia ring 19 has a central opening 91. As best shown in FIG. 2, the second inertia mass ring 19 may be provided with a recessed portion 94 on the bottom surface 88. The inner radial surface 82 and the recessed portion 94 may be configured to engage with the bearing surfaces 22 and 23 on the first inertia mass ring 13.

Returning to FIG. 1, an annular shaped cover 25 has a top surface 97, a bottom surface 100, an outer radial surface 103 and an inner radial surface 106. The inner radial surface 106 surrounds a central opening 109. As best shown in FIG. 2, the cover 25 attaches to the housing 10 to enclose the working chamber 16.

The nested design for the inertia mass rings 13 and 19 allows multiple frequency targeted viscous controlled inertia mass rings 13, 19 within a single sealed housing 10. This configuration provides the damper assembly 9 with the ability to cover a broader frequency range than single inertia mass ring dampers, without added mass and inertia of dampers configured with separate sealed cavities. This configuration also reduces the number of components needed for assembly.

Each inertia mass ring 13, 19 is able to move independently of the other, giving independent frequency resonances, in addition to unique fluid shear gaps. This gives each ring 13, 19 unique damping and spring rates, in addition to unique inertia properties. This configuration also allows the use of multiple material densities within a single damper cavity.

Applications for the damper assembly 9 of the present invention include systems with multiple critical vibration frequencies, and also systems with strict limits on mass and envelope space.

The present invention contemplates that many changes and modifications may be made. Therefore, while the presently-preferred form of the torsional vibration damper has been shown and described, persons skilled in this art will readily appreciate that various additional changes and modifications may be made without departing from the spirit of the invention.

What is claimed is:

1. A torsional vibration damper, comprising:
    a housing defining an annular space;
    a cover mounted on the housing, the cover and the housing defining an annular working chamber;
    a first mass inertia ring disposed inside and configured to rotated relative to the annular working chamber;
    a second mass inertia ring disposed inside the annular working chamber, the second inertia mass ring configured to rotate inside the annular working chamber independently with respect to the first inertia mass ring, wherein the second mass inertia ring has an axial facing surface extending a majority of a width of the second mass inertia ring and configured such that substantially all of the axially facing surface is disposed adjacent to the first mass inertia ring;
    a viscous damping media disposed inside the annular working chamber; and,
    a hub configured to extend from the housing in an axial direction, the hub configured for attaching the damper to a crankshaft.

2. The damper of claim 1, wherein the viscous damping media substantially fills shear film spaces between working surfaces of the first and second mass inertia rings and confronting working surfaces of the housing and cover within the chamber.

3. The damper of claim 1, wherein the first mass inertia ring has at least one bearing surface formed thereon for engaging with corresponding surfaces of the second mass inertia ring when the first and second mass inertia rings are disposed in the annular working chamber.

4. A torsional vibration damper, comprising:
    a housing defining an annular space;
    a cover mounted on the housing, the cover and the housing defining an annular working chamber;
    a first mass inertia ring disposed inside and configured to rotated relative to the annular working chamber;

a second mass inertia ring disposed inside the annular working chamber, the second inertia mass ring configured to rotate inside the annular working chamber independently with respect to the first inertia mass ring, wherein the second mass inertia ring is disposed adjacent to the first mass inertia ring;

a viscous damping media disposed inside the annular working chamber; and, a hub configured to extend from the housing in an axial direction, the hub configured for attaching the damper to a crankshaft; and wherein the first mass inertia ring is constructed of a different material than the second mass inertia ring.

5. A torsional vibration damper, comprising:
a housing defining an annular space;
a cover mounted on the housing, the cover and the housing defining an annular working chamber;
a first mass inertia ring disposed inside and configured to rotated relative to the annular working chamber;
a second mass inertia ring disposed inside the annular working chamber, the second inertia mass ring configured to rotate inside the annular working chamber independently with respect to the first inertia mass ring, wherein the second mass inertia ring is disposed adjacent to the first mass inertia ring;
a viscous damping media disposed inside the annular working chamber; and, a hub configured to extend from the housing in an axial direction, the hub configured for attaching the damper to a crankshaft; and,
wherein the density of the first mass inertia ring is different than the density of the second mass inertia ring.

6. A torsional vibration damper, comprising:
a housing defining an annular space;
a cover mounted on the housing, the cover and the housing defining an annular working chamber;
a first mass inertia ring disposed inside and configured to rotated relative to the annular working chamber;
a second mass inertia ring disposed inside the annular working chamber, the second inertia mass ring configured to rotate inside the annular working chamber independently with respect to the first inertia mass ring;
a viscous damping media disposed inside the annular working chamber;
a hub configured to extend from the housing in an axial direction, the hub configured for attaching the damper to a crankshaft;
wherein a portion of an upstanding radial wall extending from the first mass inertia ring forms a first bearing surface for engaging with a portion of the second mass inertia ring;
wherein the first mass inertia ring has a second bearing surface formed on a surface configured such that it is substantially parallel to a top surface of the first mass inertia ring; and,
wherein the second mass inertia ring has a recessed portion on a bottom surface, the recessed portion configured to engage with the first and second bearing surfaces on the first mass inertia ring.

7. A torsional vibration damper, comprising:
a housing defining an annular space;
a cover mounted on the housing, the cover and the housing defining an annular working chamber;
a first mass inertia ring disposed inside and configured to rotated relative to the annular working chamber, the first mass inertia ring having a radial upstanding wall extending therefrom in an axial direction, the radial upstanding wall having a bearing surface disposed thereon, the bearing surface facing in the radial direction;
a second mass inertia ring disposed inside the annular working chamber, the second inertia mass ring configured to rotate inside the annular working chamber independently with respect to the first mass inertia ring, the second mass inertia ring disposed adjacent to the bearing surface on the first mass inertia ring;
a viscous damping media disposed inside the annular working chamber; and,
a hub configured to extend from the housing in an axial direction, the hub configured for attaching the damper to a crankshaft.

8. The damper of claim 7, wherein the viscous damping media substantially fills shear film spaces between working surfaces of the first and second mass inertia rings and confronting working surfaces of the housing and cover within the chamber.

9. The damper of claim 7, wherein the second mass inertia ring has a bottom surface configured such that substantially all of the bottom surface is disposed adjacent to the first mass inertia ring.

10. The damper of claim 7, wherein the first mass inertia ring has at least one bearing surface formed thereon for engaging with corresponding surfaces of the second mass inertia ring when the first and second mass inertia rings are disposed in the annular working chamber.

11. A torsional vibration damper, comprising:
a housing defining an annular space;
a cover mounted on the housing, the cover and the housing defining an annular working chamber;
a first mass inertia ring disposed inside and configured to rotated relative to the annular working chamber, the first mass inertia ring having a radial upstanding wall extending therefrom in an axial direction, the radial upstanding wall having a bearing surface disposed thereon;
a second mass inertia ring disposed inside the annular working chamber, the second inertia mass ring configured to rotate inside the annular working chamber independently with respect to the first mass inertia ring, the second mass inertia ring disposed adjacent to the bearing surface on the first mass inertia ring;
a viscous damping media disposed inside the annular working chamber; and, a hub configured to extend from the housing in an axial direction, the hub configured for attaching the damper to a crankshaft; and,
wherein the first mass inertia ring is constructed of a different material than the second mass inertia ring.

12. A torsional vibration damper, comprising:
a housing defining an annular space;
a cover mounted on the housing, the cover and the housing defining an annular working chamber;
a first mass inertia ring disposed inside and configured to rotated relative to the annular working chamber, the first mass inertia ring having a radial upstanding wall extending therefrom in an axial direction, the radial upstanding wall having a bearing surface disposed thereon;
a second mass inertia ring disposed inside the annular working chamber, the second inertia mass ring configured to rotate inside the annular working chamber independently with respect to the first mass inertia ring, the second mass inertia ring disposed adjacent to the bearing surface on the first mass inertia ring;

a viscous damping media disposed inside the annular working chamber; and, a hub configured to extend from the housing in an axial direction, the hub configured for attaching the damper to a crankshaft; and,
wherein the density of the first mass inertia ring is different than the density of the second mass inertia ring.

\* \* \* \* \*